June 7, 1960 E. E. ROACH 2,939,475
MAGNETIC CHECK VALVE
Filed July 26, 1957 2 Sheets-Sheet 1
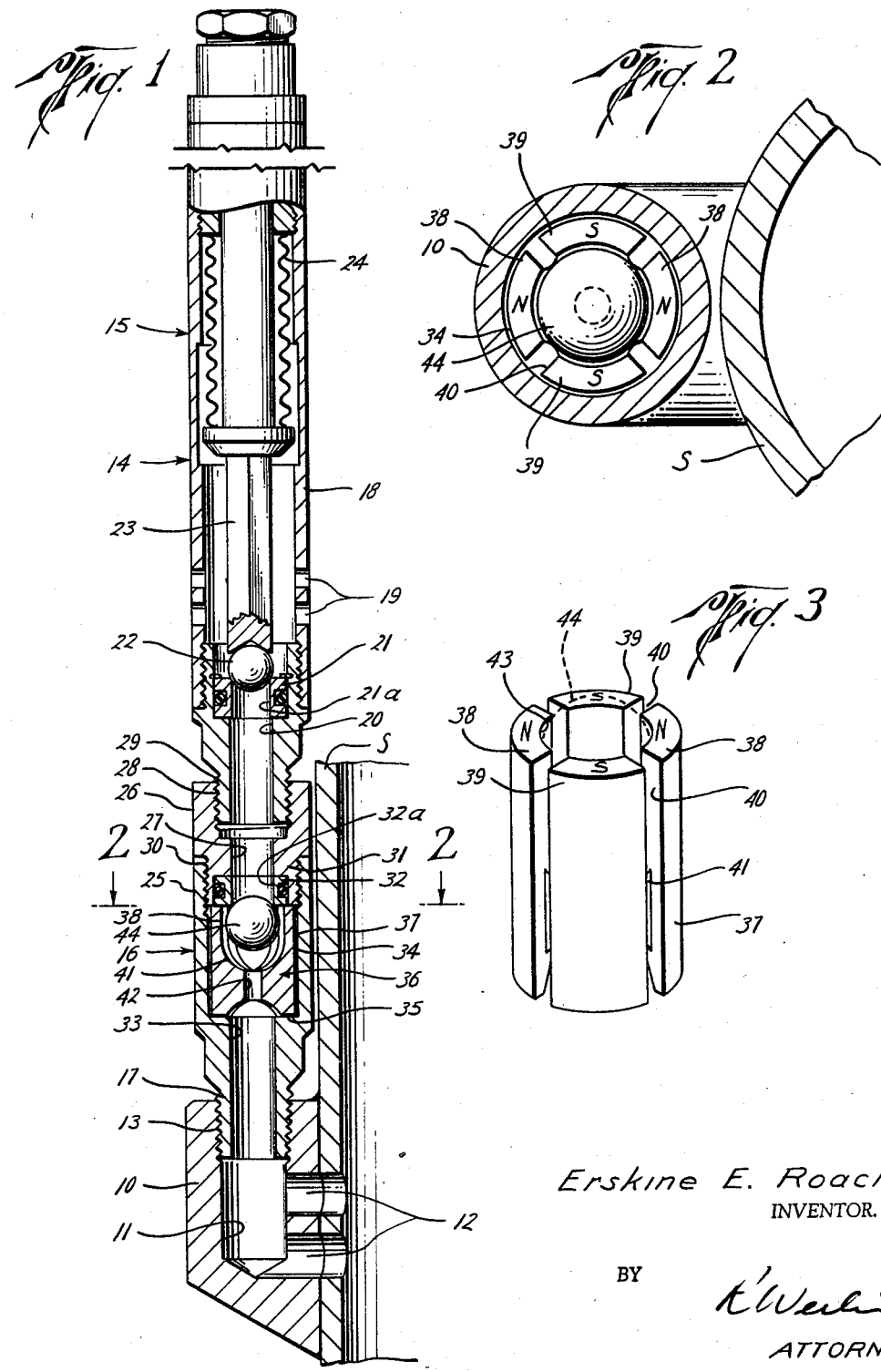
Erskine E. Roach
INVENTOR.
BY
ATTORNEY June 7, 1960
E. E. ROACH
2,939,475
MAGNETIC CHECK VALVE
Filed July 26, 1957
2 Sheets-Sheet 2
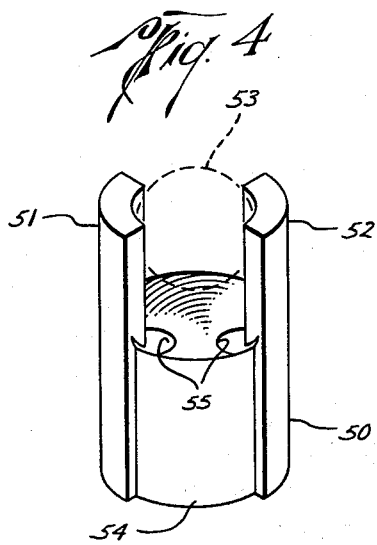
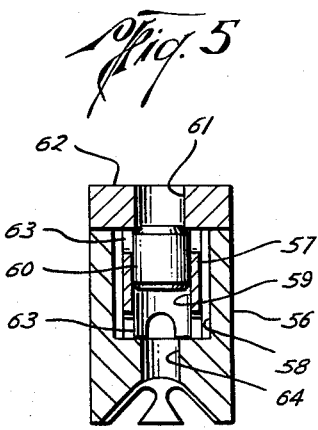
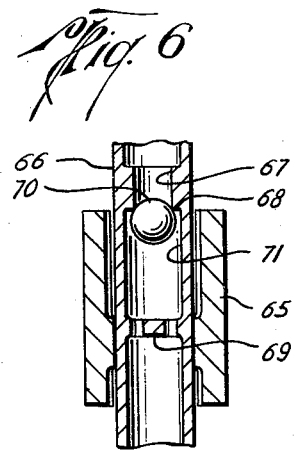
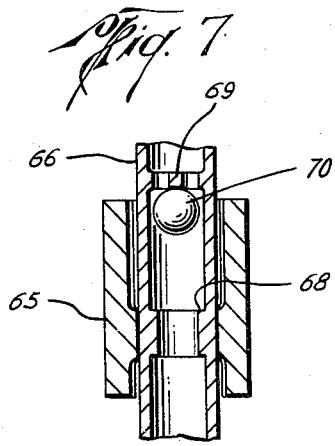
Erskine E. Roach
INVENTOR.
BY
ATTORNEY _United States Patent Office_

2,939,475
Patented June 7, 1960

2,939,475

MAGNETIC CHECK VALVE

Erskine E. Roach, Houston, Tex., assignor to Harold Brown Company, a corporation of Texas Filed July 26, 1957, Ser. No. 674,329

8 Claims. (Cl. 137—155)

This invention relates generally to magnetic check valves and more particularly to a valve device for controlling a flow port in a body by means of a magnetically operated closure member.

A primary object of the invention is to provide a magnetic check valve device adapted particularly for use with a gas lift valve of the type employed in the production of petroleum.

In gas lift systems of the kind mentioned, one or more gas injection valves are installed in a well along a production pipe string being designed to open at predetermined pressure and flow conditions to admit lifting gas to the column of fluid in the production pipe string in order to raise such fluid to the surface and thereby produce the well. Such gas lift systems may be designed to operate the valves continuously or intermittently in accordance with the particular type of system employed.

In practically every case the gas lift valve structures are equipped with check valve elements designed to be opened in one direction by the passage of lifting gas under pressure flowing toward the production pipe string and to close-off the gas injection port or passageway when pressure differentials between the interior and exterior of the production pipe string are such as to tend to cause back flow of fluid from the production string through the gas lift valve structure. In the usual gas lift system, therefore, the check valves are normally subjected to frequent and rapid reversals of flow of high pressure, high velocity fluids in the course of their operation.

In conventional gas lift valve structures these check valves may be of various forms designed to return the closure member to the closed position. In one form gravity is depended upon to cause the closure member to drop back on its seat when the pressure of the entering gas is reduced sufficiently. Another depends upon the velocity of the fluid seeking to flow back through the valve. A third and common construction comprises a resilient biasing means, such as a coil spring which is employed to return the closure member to the seat.

Each of these more conventional arrangements is subject to numerous operating difficulties. In the case of the gravity responsive valve, the valve must be mounted in a certain position which is not always practical and is, indeed, impractical in many installations. Check valves closed by velocity of fluid flow therethrough are not satisfactory because of erosion damage which results from the frequent opening and closing of the valve as the pressure varies in the production pipe string above and below that in the supply pipe string, generally the well casing. Moreover, since closing of the valve is dependent upon velocity of flow of the fluid, it will be apparent that where there is a low pressure differential across the valve, a considerable amount of fluid will be passed before the valve member is moved by fluid velocity to its seat. Spring-loaded check valves have a strong tendency to "chatter" or "hammer," thereby causing damage to the entire mechanism of the gas lift valve. Moreover, because of the relatively high frequency vibrations to which such valves are commonly subject, the return spring will generally have a relatively short life.

In all such conventional designs, therefore, difficulty with the check valve elements will result in expensive interruptions of production from the well in order to repair or replace the defective or damaged valves.

Accordingly, it is a principal object of this invention to provide for use with a gas lift valve a check valve having a magnetically actuated return means for the check valve closure to thereby obviate the difficulties and disadvantages of existing types of such structures.

Another object is to provide a magnetic check valve employing a valve cage comprising a permanent magnet and a magnetically permeable closure member movable longitudinally of the cage in the direction of the increasing intensity of the magnetic field of the cage.

A further object is to provide a device for controlling a flow port in a body which comprises a generally tubular valve cage aligned with the port, the cage comprising a permanent magnet whose field varies in intensity in a direction parallel to the axis of the cage, and which includes a closure member movable in the cage in a direction relative to the port in accordance with the direction of increasing intensity of the magnetic field of the cage.

Still another object is to provide in a gas lift valve including a gas injection passageway and a main valve controlling the injection passageway, a magnetic check valve disposed to prevent return flow of fluid through the injection passageway.

Other and more specific objects and advantages of this invention will become apparent from the following detailed description when read in conjunction with the accompanying drawing which illustrates several embodiments in accordance with this invention.

In the drawings:

Fig. 1 is a longitudinal view, largely in section, of a gas lift valve structure incorporating magnetic check valve elements in accordance with the present invention;

Fig. 2 is a cross-section taken along line 2—2 of Fig. 1;

Fig. 3 is a perspective elevational view of the magnetic cage of the check valve, the valve member being shown in broken lines in position within the cage;

Fig. 4 is a perspective elevational view similar to Fig. 3 illustrating another embodiment of a magnetic check valve in accordance with the present invention;

Figs. 5, 6 and 7 are longitudinal sectional views of additional embodiments of magnetic check valves in accordance with the present invention.

Referring to Figs. 1 to 3, there is shown a portion of a pipe string S, which may be a portion of the usual tubing string present in an oil well, and which is fitted externally with a mounting lug 10 having a central bore 11 opening to its upper end and having lateral injection passages 12—12 providing communication between bore 11 and the interior of pipe string S. The upper end of bore 11 is provided with an internally threaded socket 13 into which is threadedly inserted a gas lift valve structure, designated generally by the numeral 14, comprising a main valve portion 15 and a check valve portion 16, the latter having a threaded lower end 17 which is threadedly inserted into socket 13.

Main valve 15 is of generally conventional form and includes an outer tubular housing 18 having gas inlet ports 19 through the wall thereof, and an axial passage 20 opening through the lower end thereof. A valve seat 21 having an axial port 21a is positioned in passage 20 and is controlled by a valve 22 carried by the end of a stem 23 which extends upwardly through the housing 18 and is connected to a bellows-type motor 24. The latter is ordinarily gas-pressure loaded to a predetermined pressure to hold valve 22 in the closed position on port 21a until external gas pressure entering through ports 19 overcomes the loading pressure on the bellows and urges the main valve 22 to the open position with respect to port 21a.

As noted, this main valve may be of any generally conventional form presently employed in gas lift operations. The motor elements operating the main valve may comprise springs, gas-loaded pistons, or any other arrangements well-known in this art. The individual details or specific form of the main valve do not, therefore, constitute a part of the present invention apart from the combination to be subsequently described.

Check valve portion 16 includes a tubular casing 25 into the upper end of which is threadedly inserted a sleeve 26 having a central passage 27 therethrough aligned with passage 20 and port 21a of the main valve, and having, at its upper end, an internally threaded socket 28 adapted to receive an externally threaded pin 29 formed on the lower end of main valve section 15. The upper end of check valve casing 25 is provided with an internally threaded socket 30 to receive a threaded pin 31 carried by the lower end of sleeve 26. Passage 27 is counterbored from its lower end to receive a removable seat 32 having an axial port 32a co-axial with passage 27. Check valve casing 25 has an axial passage 33 through its lower end portion which opens through pin 17 into communication with bore 11 of the mounting lug 10. The upper portion of passage 33 in casing 25 is enlarged to provide the counterbore 34 which at its lower end defines an upwardly facing annular shoulder 35 surrounding the upper end of passage 33. Seated in counterbore 34 between shoulder 35 and the lower end of pin 31 is a magnetic check valve, designated generally by the numeral 36, and constructed in accordance with the principles of this invention.

Magnetic check valve 36, as best seen in Figs. 1, 2 and 3, comprises a generally tubular cage 37 which comprises a permanent magnet such as an Alnico magnet, or the like, and formed by a plurality of longitudinally disposed, parallel arcuate segments defining alternate north and south poles 38—38 and 39—39, respectively, separated by longitudinally extending air gaps 40. The several pole pieces 38 and 39 are connected together near their lower ends by an internal spider 41 having central opening 42 therethrough. The air gaps 40, together with the central passage 42, provide a plurality of longitudinal channels for the passage of fluid through the cage and thereby place passage 33 into communication with passage 27 when the valve is in the open position. The arcuate pole pieces 38 and 39 being circularly arranged, define a central bore 43 through the cage above spider 41. A valve or closure member 44, of suitable shape, which in this embodiment is preferably in the form of a ball, is disposed in bore 43 for relatively free longitudinal movement therein. Closure 44 is constructed of any suitable material of high magnetic permeability, such as steel. In the embodiment illustrated, the magnetic field intensity of the cage will, of course, increase in a direction parallel to the longitudinal axis of the cage toward the open upper end of the cage, and closure member 44 will, therefore, always be urged toward the open end of the cage. As seen in Fig. 1, the attraction thus exerted by the cage upon closure member 44 will be such as to tend to always urge the closure member toward seat 32 and thereby to the position closing port 32a against back-flow from passage 33.

By making the magnetic cage of the elongate, generally cylindrical form shown, uniform width air gaps will be provided between the poles and substantially uniform spacing between the poles and the closure member and the resultant effect upon closure member 44 will be to cause the latter to be always moved longitudinally of the cage toward the point of greatest field intensity and, therefore, toward the seat in passage 27. To prevent short-circuiting of the magnetic field at the ends of the poles, seat 32, casing 25 and sleeve 26 are all constructed of materials which are either non-magnetic or have low magnetic permeability, particularly as compared with the closure member and the cage. Some common materials of this character are brass and Monel.

In operation, gas flowing through ports 19 of the main valve when the latter has opened, will flow downwardly through passages 20 and 27 and port 32a in seat 32, and will force closure member 44 away from the seat in opposition to the magnetic force tending to move the closure toward the seat. With the check valve thus opened, the gas will flow through the cage and passage 33 into bore 11 of the mounting lug, and thence through passages 12 into the interior of pipe string S. When the pressure of the entering gas is reduced sufficiently to cause the main valve to close, the magnetic force in cage 37, acting on closure member 44, will return the closure member to engagement with seat 32 to close port 32a. Fluid in pipe string S tending to flow back through the valve will simply urge the closure member 44 more tightly against the seat.

The strength of the magnet comprising cage 37, may, of course, be varied in ways well understood by those familiar with magnetic structures to provide any desired degree of attractive force on closure member 44 to normally urge it to the closed position on seat 32. Ordinarily only a very light force is required, since all that is necessary is to assure that closure member 44 will always be moved against seat 32, since the fluid back pressure from pipe string S will be depended upon to hold the closure member tightly in the closed position.

The magnetic force required will be essentially that necessary to overcome the force of gravity operative on the closure member and will, therefore, be determined largely by the weight of the closure member. The relative small attractive force thus required will offer correspondingly small resistance to displacement of the closure member from its seat by the entering fluid, while effectively acting to resiliently bias the closure member toward the seat.

It will be understood that various shapes of magnets and closure members may be employed. However, in the embodiment illustrated in Figs. 1 to 3, a ball-shaped closure member is employed as it has the numerous well-known advantages of a ball in this particular application in assuring effective closing engagement with the port through seat 32.

By the use of a permanent magnet as the cage member of the check valve and a magnetically permeable closure member movable longitudinally therein, it will be evident that the difficulties commonly encountered with spring-loaded and velocity and gravity actuated check valves will be greatly obviated or entirely eliminated.

By making the cage member of the elongate, generally cylindrical form, as illustrated, the length of travel of the closure member may be made as great or as small as desired, since it will be seen that the closure member will be continuously under the magnetic attractive force in every position in the cage and will always be under compulsion of the field to move longitudinally of the cage in the direction of increasing intensity of the field.

In the case of a ball-shaped closure member is illustrated, the attraction of the ball to the pole members acts to resist rotation of the ball, although the ball is otherwise free. This is quite important in gas lift valve structures of the kind illustrated, where, when conventional ball checks are used, the velocity of the fluids passing through the valve causes rapid rotation of the ball with a consequent high rate of erosion of the ball and other metal parts in contact therewith. The magnetic valve of this invention largely eliminates this undesirable condition.

Figs. 4 to 7, inclusive, illustrate several additional embodiments of magnetic check valve devices embodying the principles of this invention.

Fig. 4 illustrates a cage arrangement quite similar to that illustrated in Figs. 1 to 3, except that two pole pieces are employed instead of four. In this embodiment the generally cylindrical magnetic cage 50 includes a pair of elongate oppositely disposed pole pieces 51, 52 defining circular segments in cross-section and adapted to confine between them a ball shaped closure member 53 shown in broken outlines. The lower ends of the pole pieces are integrally connected to the spider 54 having longitudinal passages 55 therethrough. This cage and closure member operates in exactly the same manner as the previously described embodiment.

Fig. 5 illustrates an embodiment designed to employ a cylindrical closure member instead of the ball-shaped closure member of the preceding embodiments. In this embodiment, the non-magnetic tubular sleeve or liner 57 is installed in bore 58 of the cage and has a bore 59 dimensioned to guide a cylindrical closure member 60 longitudinally relative to the port 61 in a seat member 62 mounted over the upper end of cage 56. Liner 57 has a plurality of openings 63 in the wall thereof to permit passage of fluid between port 61 and passage 64 in the lower end of the cage when the closure member is moved away from seat member 62.

The operation of the closure member is the same as in the previously described embodiments, in that the magnetic field will act upon closure member 60 to urge it toward seat 62 irrespective of the interposition of non-magnetic liner 57. The latter may be constructed of any suitable non-magnetic material.

Figs. 6 and 7 illustrate arrangements employing non-magnetic fluid conduits extending through the bore of the magnetic cage, the seats and closures therefor being enclosed within the conduits. These modifications are particularly adapted for use where the fluids are likely to be corrosive to the metal of the cages.

In Fig. 6 the generally cylindrical cage 65 may be substantially identical in construction with those of the previously described embodiments. A tubular conduit 66 constructed of a suitable non-magnetic material, which may be glass, plastic or suitable metallic material, extends axially through the bore of cage 65 and is provided internally of its bore 67 at a point opposite the upper end of cage 65 with a downwardly facing seat 68 spaced above a perforated stop or spider 69. A ball-shaped closure member 70 constructed of magnetically permeable material is disposed in the space 71 between seat 68 and spider 69. Closure ball 70 will, of course, be actuated by the field of the cage to be normally drawn against seat 69 to close bore 67 of the conduit against fluid flow upwardly through the conduit, and will constitute a normally closed check valve.

The embodiment illustrated in Fig. 7 is substantially identical to that illustrated in Fig. 6 except that the positions of seat 68 and spider 69 are reversed. In this embodiment the ball 70 will normally be magnetically urged against spider 69 and away from seat 68 and will thus constitute a normally open check valve.

It will be understood that numerous changes, modifications, and alterations may be made in the details of the illustrative embodiments within the scope of the appended claims without departing from the spirit of this invention.

What I claim and desire to secure by Letters Patent is:

1. In a gas lift system including a well pipe having a gas injection passage leading therein and a valve seat in the passage, check valve means for controlling backflow of fluid through said passage, said check valve means comprising a generally tubular valve cage defining a portion of said passage, said cage comprising a permanent magnet whose field intensity increases in the direction of said seat, and a magnetically permeable valve member longitudinally movable in the cage.

2. A magnetic check valve, comprising, a body having a flow passage therethrough, an annular seat in the passage, a generally tubular valve cage mounted in the passage with one end adjacent the seat and having a cylindrical bore coaxial with said seat, said cage comprising a permanent magnet whose field intensity increases toward said one end, and a magnetically permeable valve element disposed within said bore for movement into closing engagement with said seat under the influence of said field.

3. A magnetic check valve according to claim 2 wherein said valve element is ball-shaped.

4. A magnetic check valve, comprising, a body having a flow passage therethrough, an annular seat in said passage, a generally tubular valve cage mounted in the flow passage with one end adjacent said seat and having a cylindrical bore co-axial with said seat, said cage comprising a permanent magnet whose field intensity increases toward said one end, said cage being defined by a plurality of longitudinally extending spaced parallel portions forming magnetic pole members and means connecting said portions together at a point spaced from said one end, and a magnetically permeable valve element disposed within said bore for movement longitudinally thereof into closing engagement with said seat under the influence of said field.

5. As a sub-combination, a cage-and-valve construction for a check valve, comprising, a generally cylindrical cage having a longitudinal bore and comprising a permanent magnet whose field intensity increases toward one end, and a magnetically permeable valve element disposed within said bore for movement longitudinally thereof toward said one end under the influence of said field.

6. A cage-and-valve construction according to claim 5 wherein said valve element is ball-shaped.

7. As a sub-combination, a cage-and-valve construction for a check valve, comprising, a generally tubular cage having a longitudinal bore and comprising a permanent magnet whose field intensity increases toward one end, said cage comprising a plurality of longitudinally extending spaced parallel portions forming magnetic pole members and means connecting said portions together at a point spaced from said one end, and a magnetically permeable ball-shaped valve disposed within said bore for movement longitudinally thereof toward said one end under the influence of said field.

8. As a sub-combination, a cage-and-valve construction for a check valve, comprising, a generally cylindrical cage having a longitudinal bore and comprising a permanent magnet whose field intensity increases toward one end, a tubular member of non-magnetic material co-axially disposed in the bore of the cage, and a magnetically permeable valve element disposed within the bore of said tubular member for movement longitudinally thereof toward said one end under the influence of said field.

References Cited in the file of this patent

UNITED STATES PATENTS

| | | |
|---|---|---|
| 2,274,968 | Bannon | Mar. 3, 1942 |
| 2,597,952 | Rosenlund | May 27, 1952 |
| 2,629,401 | Miller | Feb. 24, 1953 |
| 2,661,024 | Knox | Dec. 1, 1953 |
| 2,668,553 | Howard et al. | Feb. 9, 1954 |
| 2,811,979 | Presnell | Nov. 5, 1957 |